United States Patent
Sawada et al.

(10) Patent No.: US 6,654,494 B1
(45) Date of Patent: Nov. 25, 2003

(54) COLOR IMAGE PROCESSING APPARATUS AND COLOR IMAGE PROCESSING METHOD THEREOF

(75) Inventors: Takayuki Sawada, Tokyo (JP); Hiroki Kanno, Yokohama (JP)

(73) Assignees: Kabushiki Kaisha Toshiba, Kawasaki (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/470,880

(22) Filed: Dec. 22, 1999

(30) Foreign Application Priority Data

Dec. 22, 1998 (JP) .......................................... 10-365581

(51) Int. Cl.[7] .................................................. G06K 9/00
(52) U.S. Cl. ........................ 382/167; 358/1.9; 358/518
(58) Field of Search ................................. 382/162, 167, 382/274; 358/1–9, 500, 504, 516–527; 345/589–592, 597, 600, 601–604

(56) References Cited

U.S. PATENT DOCUMENTS

| | | | |
|---|---|---|---|
| 5,200,817 A | 4/1993 | Birnbaum | 358/518 |
| 5,442,717 A | * 8/1995 | Murakami | 382/162 |
| 5,631,749 A | * 5/1997 | Ueda | 358/520 |
| 5,828,781 A | * 10/1998 | Nakano | 382/162 |
| 5,854,633 A | 12/1998 | Cooper et al. | 345/603 |
| 5,923,446 A | * 7/1999 | Nakagiri | 358/520 |

FOREIGN PATENT DOCUMENTS

| | | | |
|---|---|---|---|
| JP | 6-169393 | 6/1994 | H04N/1/60 |
| JP | 6-57047 | 7/1994 | H04N/1/40 |
| JP | 9-149272 | 6/1997 | H04N/1/60 |
| JP | 10-70668 | 3/1998 | H04N/1/60 |
| JP | 10-257340 | 9/1998 | H01N/1/60 |
| JP | 10-262156 | 9/1998 | H04N/1/60 |
| JP | 11-112819 | 4/1999 | H04N/1/60 |
| JP | 11-112822 | 4/1999 | H04N/1/60 |

* cited by examiner

*Primary Examiner*—Leo Boudreau
*Assistant Examiner*—Ishrat Sherali
(74) *Attorney, Agent, or Firm*—Foley & Lardner

(57) ABSTRACT

A color image processing apparatus comprises a memory for storing first LCH color coordinate data which are LCH color coordinate data corresponding to a cross point address of a color converting LUT, a color adjustment section for adjusting the first LCH color coordinate data to output second LCH color coordinate data, a first converting section for converting the second LCH color coordinate data into first CMY color coordinate data, a renewal section for renewing the color converting LUT based on the first CMY color coordinate data, and a second converting section for converting input RGB image data based on the color converting LUT to output second CMY image data. With this apparatus, it is possible to also realize the color adjustment in generating color converting LUT.

8 Claims, 4 Drawing Sheets

$$\begin{bmatrix} C' \\ M' \\ Y' \end{bmatrix} = \begin{bmatrix} D_{00} & D_{01} & D_{02} & D_{03} & D_{04} & D_{05} & D_{06} & D_{07} & D_{08} & D_{09} \\ D_{10} & D_{11} & D_{12} & D_{13} & D_{14} & D_{15} & D_{16} & D_{17} & D_{18} & D_{19} \\ D_{20} & D_{21} & D_{22} & D_{23} & D_{24} & D_{25} & D_{26} & D_{27} & D_{28} & D_{29} \end{bmatrix} \begin{bmatrix} R_i \\ G_i \\ B_i \\ R_i^2 \\ G_i^2 \\ B_i^2 \\ R_i G_i \\ G_i B_i \\ B_i R_i \\ 1 \end{bmatrix} \cdots [1]$$

$\underbrace{\phantom{XXXXXXXXXXXXXXX}}_{\text{BASIC COLOR CONVERTING PARAMETER}}$

FIG. 4

$$\begin{bmatrix} C_i \\ M_i \\ Y_i \end{bmatrix} = \begin{bmatrix} F_{00} & F_{01} & F_{02} \\ F_{10} & F_{11} & F_{12} \\ F_{20} & F_{21} & F_{22} \end{bmatrix} \begin{bmatrix} C' \\ M' \\ Y' \end{bmatrix} \cdots [2]$$

$\underbrace{\phantom{XXXXXX}}_{\text{DIFFERENTIAL COLOR CONVERTING PARAMETER}}$

FIG. 5

COLOR IMAGE PROCESSING APPARATUS AND COLOR IMAGE PROCESSING METHOD THEREOF

BACKGROUND OF THE INVENTION

The present invention relates to a color image processing apparatus applicable for an image generating apparatus which copies an image of an object onto a material to which an image is to be transferred.

Color adjustment in color copier includes correction when an output image does not correctly reproduce color of an input image (original), and process for intentionally outputting color which is different from input image.

Conventionally disclosed color adjusting technique generally employs a method in which image data are converted into three attribute coordinate data representing color phase (H), lightness (L) and chroma (C) which are three attributes of color, the three attribute coordinate data are adjusted by increasing or decreasing each of the attributes on the three attribute coordinate and then, the adjusted data are returned to original color space (RGB (an additive process, i.e., the three primary colors of color light by red, green and blue) or CMY (subtractive color, i.e., the three primary colors of color material by cyan, magenta and yellow) and the like).

However, according to this method, it is known that processing time required for converting data with respect to the three attribute coordinate becomes extremely long.

For this reason, it was contrived that the RGB color space is converted into color space (such as HSV) a having high correlation with the three attribute by relatively simple computation, but precision of the correlation with the three attribute is not always sufficient.

Apart from this, in a color copier, in a color converting step utilized when input image data presented in color light three primary color (RGB) color space are converted color material three primary color (CMY) color space and reproduced on storage medium, a method in which sample color patch (color sample image) output by an apparatus (copier) itself is read, a set of RGB-CMY data of a patch of a plurality of colors is collected, and a coefficient of conversion polynomial from RGB to CMY is obtained using least squares is known as a method for obtaining parameter of color conversion.

However, according to this operation, mechanical precision is required for reading the color patch. Further, there exists contradictory conditions that it is preferable that color patch having colors as much as possible in order to obtain precise color conversion parameter, and in order to output patches of many colors on a sheet of paper having a fixed area, an area of each of patches must be small.

This fact means that precision required from reading of patches to extraction of data is severer, and when a higher priority is given to the precision, it is necessary to sufficiently increase the time for obtaining color conversion parameter. On the other hand, if the number of color patches is reduced so as to reduce the processing time, there is a problem that the precision of color conversion is lowered.

BRIEF SUMMARY OF THE INVENTION

It is an object of the present invention to provide an image processing apparatus and image processing method which is applicable for a color copier and the like, and capable of adjusting and converting color at high speed, with high precision and inexpensively.

According to the present invention defined in claim 1 which is a first embodiment of the invention, there is provided a color image processing apparatus comprising: storing means for storing first image data represented in first color space corresponding to a cross point address of a color converting look-up table; color adjustment means for adjusting color in the first image data stored in the storing means to output second image data represented in the first color space so as to carry out a predetermined color adjustment in an input image; first converting means for converting the second image data output from the color adjustment means to output third image data represented in a second color space; renewal means for renewing the color converting look-up table based on the third image data output from the first converting means; and second converting means for converting fourth image data represented in a third color space which was input, based on the color converting look-up table which was renewed by the renewal means, and outputting a fifth image data represented in the second color space.

The above-described color image processing apparatus of the present invention is used in a color copier. In a conventional apparatus, after RGB/CMY conversion is carried out, color adjustment is further carried out independently. In the present invention, the parameter for RGB/CMY conversion is renewed for adjusting colors, the RGB/CMY conversion and the color adjustment are carried out at a time. With this feature, when the parameter for the RGB/CMY conversion is generated, the color adjustment has also been carried out. Therefore, it is possible to provide a color image processing apparatus capable of shorten the entire processing time.

According to claim 5 which is a second embodiment of the present invention, there is provided a color image processing apparatus comprising: storing means for storing first color coordinate data represented in first color space corresponding to a cross point address of a color converting look-up table; extracting means for extracting a first color data group from image data represented in the input first color space; basic color converting parameter generator means for generating a basic color converting parameter based on the first color data group supplied from the extracting means and a second color data group represented in a given second color space; first basic color converting means for converting basic color of the first color coordinate data stored in the storing means to output first image data represented in the second color space based on the basic color converting parameter; second color converting means for converting basic color of the first color data group extracted by the extracting means to output a third color data group represented in the second color space based on the basic color converting parameter; differential color converting parameter generator means for generating a differential color converting parameter based on the third color data group output from the second basic color converting means and a fourth color data group represented in the given second color space; differential color converting means for converting differential color of the first image data output from the first basic color converting means to output second image data represented in the second color space based on the first differential color converting parameter generated by the differential color converting parameter generator means; renewal means for renewing the color converting look-up table based on the second image data output from the differential color converting means; and second converting means for converting input image data represented in the first color space to output image data represented in the second color space.

In the above-described present invention, the look-up table for the RGB/CMY image color conversion is set, the differential color conversion is carried out in addition to the basic color conversion. With this feature, rough color conversion is set by the basic color conversion, and in a portion in the image requiring fine adjustment from a user or the like, the look-up table is finely adjusted by this differential color conversion, and it is possible to obtain a desired adjusted image. With this feature, when the parameter of the look-up table of the RGB/CMY image color converting section is made, it is possible to adjust color with high precision and at high speed without newly providing a color adjustment section.

According to the present invention defined in claim 8 which is a third embodiment of the invention, there is provided a color image processing apparatus comprising: extracting means for extracting a first color data group which is color coordinate data having a plurality of colors from input image data represented in a first color space; first generator means for generating a basic color converting parameter based on the first color data group output from the extracting means and a given second color data group; first basic color converting means for converting basic color of the input image data to output color-converted image data represented in a second color space based on the basic color converting parameter output from the generator means; second basic color converting means for converting basic color of the first color group to output a third color data group represented in the second color space based on the basic color converting parameter generated by the generator means; second generator means for generating the differential color converting parameter based on the third color data group output from the second basic color converting means and a given fourth color data group; and differential color converting means for converting differential color of the color-converted image data output from the first basic color converting means based on the differential color converting parameter output from the generator means.

In the above-described invention, both the basic color conversion and the differential color conversion are carried out at the time of the RGB/CMY image conversion of the input image like the second embodiment. The third embodiment is different from the second embodiment in that the look-up table and the color coordinate data corresponding to the cross point address are not indispensable. However, like the second embodiment, a basic color conversion is specified by the basic color conversion, and fine color conversion in accordance with fine requirements is carried out by the differential color conversion, thereby providing a color image processing apparatus which realizes a high-speed and high precision color conversion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing an equation of color conversion process of the present invention; and FIG. 5 is a view showing an equation of color conversion process of the invention.

DETAILED DESCRIPTION OF THE INVENTION

An image processing apparatus according to a first embodiment of the present invention will be explained in detail using the drawings below. In the first embodiment, (in a conventional image processing apparatus, color is adjusted after RGB/CMY image color conversion), renewal of a look-up table corresponding to necessary color adjustment is included in a process for making the look-up table of RGB/CMY image color conversion. With this feature, image processing speed is enhanced.

Figure 1:
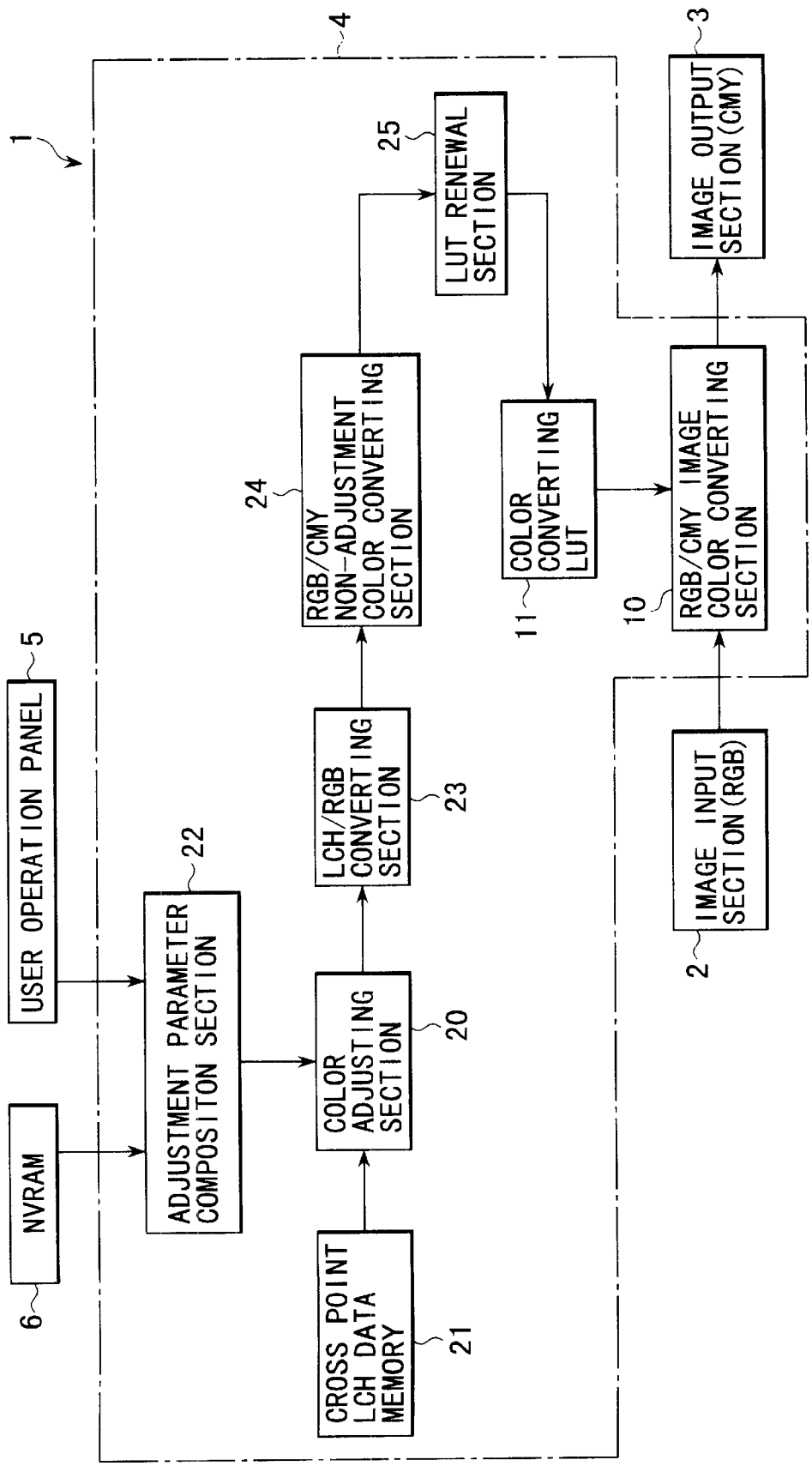
FIG. 1 is a schematic block diagram for explaining an image processing apparatus according to a first embodiment of the present invention.

FIG. 1 is a schematic block diagram for explaining an image processing apparatus according to the first embodiment of the present invention. As shown in FIG. 1, the image processing apparatus 1 of the first embodiment includes an image inputting section 2 into which an image signal from an image reading apparatus (such as a scanner) which is not shown is input, an image outputting section 3 for outputting an image signal (for printing) to an image generating apparatus (such as a printer) which is not shown, and an image processing section 4 capable of changing color reproduction between an input image (original) and an output image when the image signal input to the image inputting section 2 is output to the image outputting section 3.

The image processing section 4 can adjust color if necessary which will be explained later when the input image supplied from the image inputting section 2 as an input image which is decomposed into color light three primary colors (RGB) is converted to color material three primary colors (CMY) utilized for forming an image in a printer, a color copier or the like connected to the image outputting section 3, that is, when the output image does not precisely reproduce colors of the input image and it is desired to correct the colors, or when it is desired to intentionally change the colors from those of input image and output. The image processing section 4 includes an image color converting section 10 for converting color based on adjustment amount which will be explained later, and a color adjustment section 20 for setting the adjustment amount of color to be converted by the image color converting section 10.

Connected to the color adjustment section 20 are a cross point LCH data memory 21 storing, with respect to cross points, data of the three attributes of color, i.e., lightness (L), chroma (C) and color phase (H), corresponding to cross point address of a color converting look-up table (LUT, hereinafter) 11 connected to a first part of the image color converting section 10, and an adjustment parameter composition section for composing composite adjustment parameter based on adjustment parameter stored in a nonvolatile memory (NVRAM) 6 for example. The adjustment parameter is previously set when the copier and the adjustment parameter input from a user operation panel 5 is assembled or adjusted for example.

Connected between the color adjustment section 20 and the image color converting section 10 in the named order are an RGB converting section 23 for converting the adjustment amount (adjusted cross point data) output by the color adjustment section 20 from data from each of LCH (three attributes) stored in the cross point LCH data memory 21 and the composite adjustment parameter supplied from the adjustment parameter composition section 22, a non-adjustment color converting section 24 (CMY converting section) 24 for converting RGB data output from the RGB converting section 23 into CMY which is the same color space as the output image data, and an LUT renewal section 25 for renewing (rewriting) data of the color converting LUT 11 of the first part of the image color converting section 10.

Next, one example of processing in the image processing apparatus shown in FIG. 1 will be explained.

In an image generating apparatus, e.g., a color copier which is not shown, an image that is generated on a storing medium (paper) on which the image is finally output is usually obtained by arranging (superposing) toner particles (visible agent) comprising dye, colorant, or electric charge controlling agent and resin material at a predetermined rate by an electrostatic copying process. Therefore, color space required by the image outputting section 3 is color material three primary color (CMY).

Whereas, in many of input images, color space is converted from RGB to CMY in the image processing section 4 between the image outputting section 3 and the image inputting section 2 as explained above. However, in the conversion from RGB to CMY, there is a contradictory problem that if an attempt is made to enhance the precision, the processing time is increased, and an attempt is made to reduce the processing time, the precision is lowered.

Thereupon, in the present invention, as shown in FIG. 1, the input image data is converted from RGB to CMY by the color converting LUT 11, and the adjustment amount of color adjustment for specifying the color converting LUT 11 is independently set by the color adjustment section 20.

More specifically, in the color adjustment section 20, adjustment parameters I, c and h of L, C and H given from the adjustment parameter composition section 22 with respect to LCH data of all of cross points previously stored in the cross point LCH data memory 21 are used, and all of cross point data L', C' and H' after adjustment are obtained by, for example, the following conversion equations:

$$L'=L+1,$$

$$C'=C \times c,$$

and $$H'=H+h,$$

and the adjusted cross point LCH data (L', C' and H') are converted to RGB which is the same color space as the input image data by the RGB converting section 23, the adjusted cross point data converted into RGB are converted into CMY which is the same color space as the output image data by the non-adjustment color converting section 24. With this operation, the adjustment amount set in the color adjustment section 20 is reflected in the color converting LUT 11 indicating the conversion amount of the image color converting section 10 to be output to the image outputting section 3. That is, CMY data output from the non-adjustment color converting section 24 is written into the color converting LUT 11 by the LUT renewal section 25, and the written data become the conversion amount that the image color converting section 10 converts the input image. Since the non-adjustment color converting section 24 only converts the color space from RGB to CMY without color adjustment, the non-adjustment color converting section 24 is called non-adjustment color converting section.

On the other hand, the adjustment parameters 1, c and h used for setting (composing) the adjusted LCH data (L', C' and H') output by the color adjustment section are uniquely set to adjustment parameters which are previously set in the NVRAM 6 and adjustment parameter which are input from the user operation panel 5 by the following conversion equations:

$$l=l\text{NVRAM}+l\text{PANEL},$$

$$c=c\text{NVRAM}+c\text{PANEL},$$

$$h=h\text{NVRAM}+h\text{PANEL},$$

(wherein, the attached word NVRAM indicates an adjustment amount stored in the NVRAM, and the attached word PANEL indicates an adjustment amount which is input from the user operation panel).

In this manner, the image processing apparatus of the present invention adjusts colors of the color coordinate data corresponding to the cross point address of the color converting LUT, and converts the colors (color conversion from RGB to CMY only) by parameters which do not reflect the color adjustment on the result of the color adjustment at all, and the color converting LUT is written by the conversion result, thereby adjusting the colors of the input image.

Further, a second embodiment will be explained below. In the first embodiment, when the look-up table of the RGB/CMY image color converting section is made, the look-up table is renewed in accordance with necessary color adjustment.

In the second embodiment, the look-up table of the RGB/CMY image color converting section is made using color patch image irrespective of color adjustment, and the look-up table includes differential color conversion which is a feature of the present invention is carried out in addition to conventional basic color conversion of cross point data. with this, it is possible to convert the color with higher precision than the conventional method.

Figure 2:
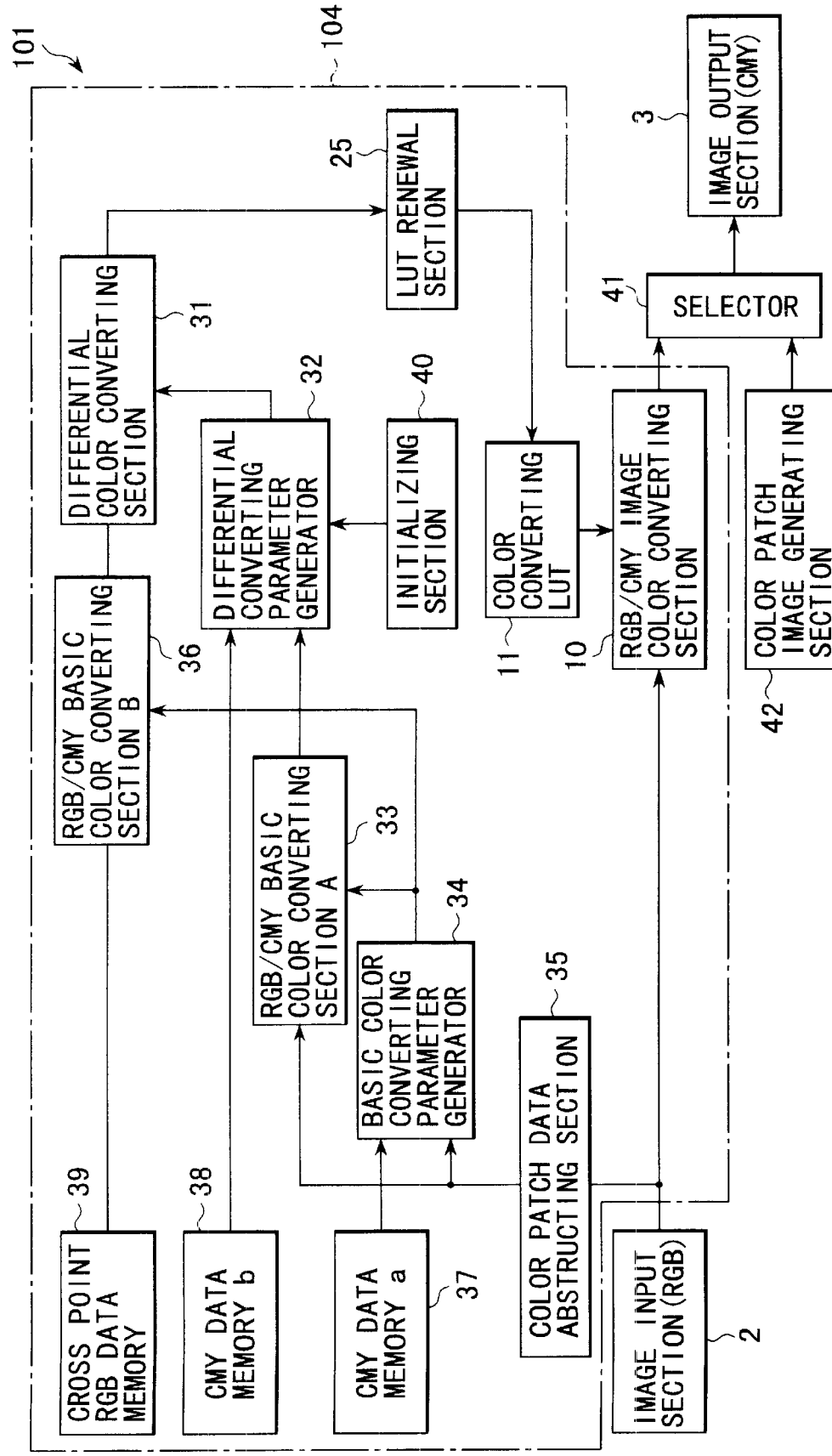
FIG. 2 is a schematic block diagram for explaining an image processing apparatus which is different from that shown in FIG. 1.

FIG. 2 is a schematic block diagram showing an image processing apparatus which is different from that shown in FIG. 1. Elements in FIG. 2 similar to those shown in FIG. 1 are designated by the same reference symbols, and detailed explanations thereof are omitted.

As shown in FIG. 2, the image processing apparatus 101 includes an image inputting section 2, an image outputting section 3 and an image processing section 104.

The image processing section 104 includes an image color converting section 10, a color converting LUT 11 and an LUT renewal section 25, a differential color converting section 31 which will be explained later, a differential converting parameter generator 32, a basic color converting section A (first basic color converting section) 33, a basic color converting parameter generator 34, a color patch data extracting section 35, and a basic color converting section B (basic color converting section) 36. A CMY data memory a37 is connected to the basic color converting parameter generator 34, a CMY data memory b38 is connected to the differential color converting parameter generator 32, and a cross point RGB data memory 39 is connected to the basic color converting section B36. A color patch image generating section 42 is connected to the image outputting section 3 through a selector 41.

Next, one example of processing in the image processing apparatus shown in FIG. 2 will be explained.

First, a generating method of the basic color converting parameter will be explained.

Color patch image data corresponding to CMY data stored in the CMY data memory a37 are generated using the color patch image generating section 42, and (first) color patch image is output in the image outputting section 3.

Subsequently, the output color patch image is input from the image inputting section 2 by a scanner which is not shown, thereby obtaining input color patch image data.

Next, RGB data A of each color in the color patch image are extracted from the input color patch image data by the color patch data extracting section 35, and the extracted RGB data A are supplied to the basic color converting parameter generator 34.

Thereafter, using the extracted RGB data A of the color patch image and CMY data (the same data as original data for outputting the color patch image) stored in the CMY data memory a37, basic color converting parameters D00 to D29 which satisfy approximately all of the RGB data of the color patch image and the CMY data equation (1) are generated in the basic color converting parameter generator 34.

In the equation (1) in FIG. 4, D00 to D29 show basic color converting parameters.

When the basic color converting parameter is set, it is possible to set the parameter such that the differential color converting parameter generator 32 is returned to a predetermined initial state by an initializing section 40 to defeat the differential color conversion.

Next, a method for generating the differential color converting parameter which is the feature of the second embodiment will be explained.

Color patch image data corresponding to CMY data stored in the CMY data memory b38 are generated using the color patch image generating section 42, and (second) color patch image is output in the image outputting section 3. The CMY data memory b38 may be used commonly with the CMY data memory a37.

Subsequently, the output color patch image is input from the image input section 2 by a scanner or the like which is not shown, thereby obtaining the input color patch image data.

Next, RGB data B of each color of the color patch image are extracted from the input color patch image data by the color patch data extracting section 35, and the extracted RGB data B are supplied to the basic color converting section A33.

Thereafter, using the previously generated basic color converting parameter by the equation (1) in FIG. 4, the color patch RGB data are converted to CMY data, and the latter are supplied to the differential color converting parameter generator 32.

Next, using the conversion results C', M' and Y' obtained by converting the color patch RGB data b into CMY data, and CMY data (the same data as the original data for outputting the color patch image) stored in the CMY data memory b38, differential color converting parameters F00 to F02, F10 to F12 and F20 to F22 which satisfy approximately an equation shown in FIG. 5 are generated in the differential color converting parameter generator 32 by least squares.

In the equation (2) in FIG. 5, F00 to F02, F10 to F12 and F20 to F22 show differential color converting parameters.

Next, a method for calculating a value to be written in the color converting LUT 11.

First, cross point RGB data corresponding to all the cross point addresses of the color converting LUT 11 stored in the cross point RGB data memory 39 are supplied to the basic color converting section B36.

Next, the cross point RGB data are converted into the cross points C', M' and Y' data by the basic color converting section B36 from the previously generated basic converting parameters. Since the processing in the basic color converting section B is substantially the same as that by the basic color converting section A which was explained above, detailed explanation thereof will be omitted.

Subsequently, the cross points C', M' and Y' data supplied from the basic color converting section B are converted into cross point C, M and Y data by the differential converting section 31 based on the previously generated differential color converting parameters by the equation (2) in FIG. 5.

The cross point C, M and Y data obtained in this manner are written in the color converting LUT 11 by the LUT renewal section 25.

Thereafter, colors of the image data input by the image inputting section 2 are converted by the image color converting section 10 based on the renewed data written in the color converting LUT 11, and the converted data are output to the image outputting section 3.

With this operation, in the output image which is output from an image generating apparatus (not shown), color conversion of the RGB/CMY image color converting section is carried out by two conversions comprising basic parameter and differential parameter (the conventional technique does not have the latter parameter). With this, it is possible to provide image processing apparatus capable of realizing a high precision converting characteristics as a whole in which the basic parameter is only set once and is not substantially changed, and conditions corresponding to changes in setting and differences depending on users can be satisfied by setting only the differential parameters by a simple method.

Figure 3:
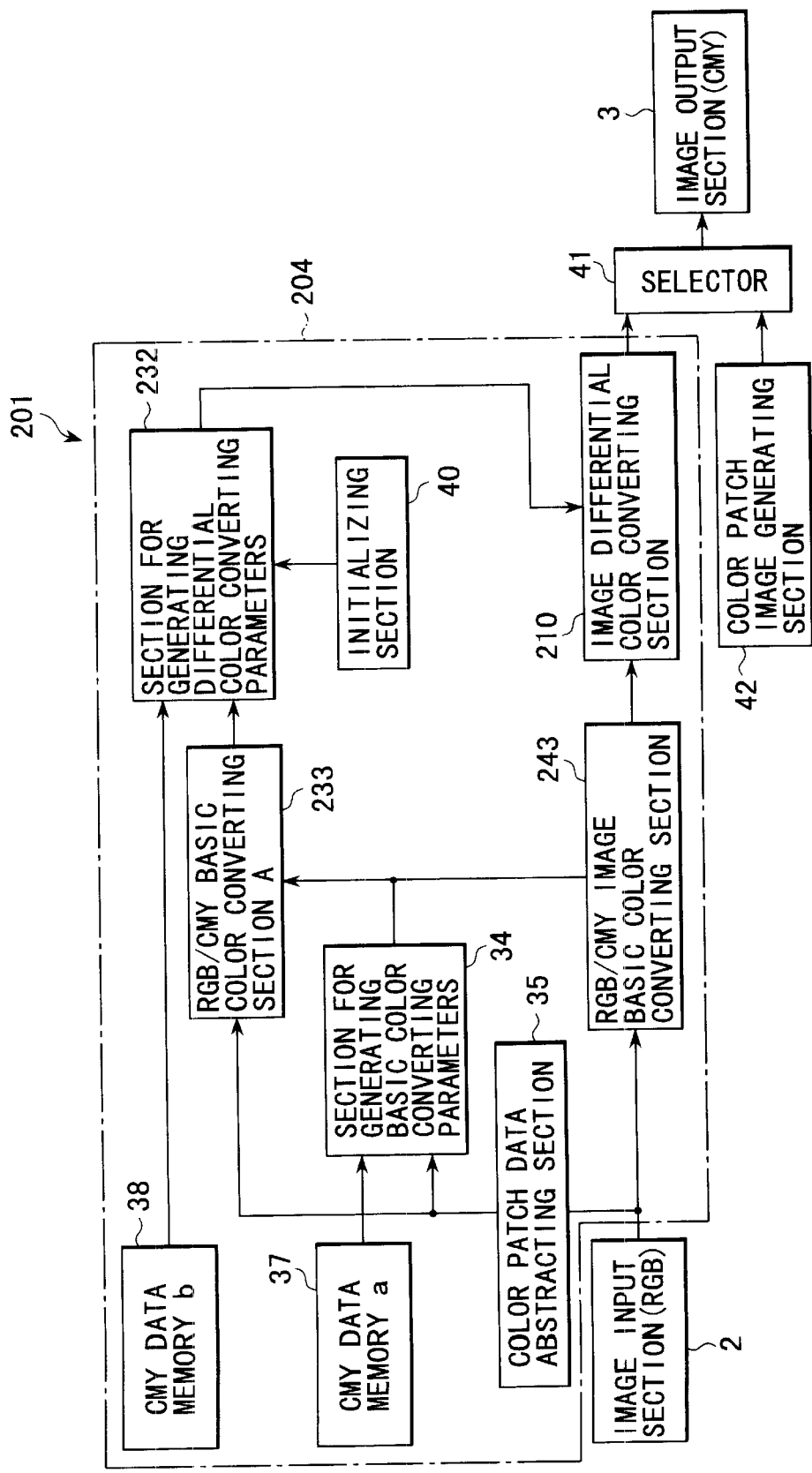
FIG. 3 is a schematic block diagram for explaining another embodiment of an image processing apparatus shown in FIG. 2.

A third embodiment of the present invention will be explained in detail below. The third embodiment uses both basic color conversion and differential color conversion without using cross point data or look-up table, and provides an image generating processing for carrying out high precision color conversion processing of an input image. FIG. 3 is a schematic block diagram showing an example of an image processing apparatus which is the third embodiment of the image processing apparatus shown in FIG. 2. Elements in FIG. 3 similar to those shown in FIG. 1 or 2 are designated by the same reference symbols, and detailed explanations thereof are omitted.

As shown in FIG. 3, the image processing apparatus 201 includes an image inputting section 2, an image outputting section 3 and an image processing section 204.

The image processing apparatus 204 is substantially similar to the image processing apparatus 101 shown in FIG. 2, and is provided with a differential converting parameter generator 232, a basic color converting section 233, a basic color converting parameter generator 34, a color patch data extracting section 35, an image basic color converting section 243, an image differential color converting section 210 for outputting converted image data to the image outputting section 3. A CMY data memory a37 is connected to the basic color converting parameter generator 34, and a CMY data memory b38 is connected to the differential color converting parameter generator 232. A color patch image generating section 42 is connected to the image outputting section 3 through a selector 41.

Next, one example of processing in the image processing apparatus 201 shown in FIG. 3 will be explained. Since a method for generating the basic color converting parameters is substantially the same as the above-explained method shown in FIG. 2, detailed explanation thereof will be omitted, and a method for generating the differential color converting parameters will be explained.

Color patch image data corresponding to CMY data stored in the CMY data memory b38 are generated using the color patch image generating section 42, and color patch image is output in the image outputting section 3.

Subsequently, the output color patch image is input from the image input section 2 by a scanner or the like which is not shown, thereby obtaining the input color patch image data.

Next, RGB data B of each color of the color patch image are extracted from the input color patch image data by the color patch data extracting section 35, and the extracted RGB data B are supplied to the basic color converting section 233.

Thereafter, using the previously generated basic color converting parameter, the color patch RGB data are converted to CMY data, and the latter are supplied to the differential color converting parameter generator 232.

Next, using the conversion results C', M' and Y' obtained by converting the color patch RGB data b into CMY data, and CMY data (the same data as the original data for outputting the color patch image) stored in the CMY data memory b38, differential color converting parameters F00 to F02, F10 to F12 and F20 to F22 which satisfy approximately an equation (2) shown in FIG. 5 are generated by least squares.

On the other hand, colors of the RGB image data input from the image inputting section 2 are converted into intermediate image data (C', M' and Y' data) represented in the CMY color space by the equation (1) by means of the image basic color converting section 243, colors of the intermediate image data are further converted into CMY image data by the equation (2) by means of the image differential color converting section 210, and are output to an image generating apparatus (not shown) by the image outputting section 3.

As explained above, in the image processing apparatus of the present invention according to the first embodiment, colors of the color coordinate data corresponding to addresses of the cross points of the color converting LUT are adjusted, the color conversion (only the color conversion from RGB to CMY) is carried out using parameters which do not affect the color adjustment on the color adjustment result, the color converting LUT is written with this color conversion result, thereby adjusting the colors of the input image. Therefore, even when the colors are adjusted, the image can be processed by the same processing procedure as that of the case non-adjustment, and it is possible to prevent the processing time in the image processing from increasing.

Further, since the parameter of the color adjustment can be changed for each of the cross points of the color converting LUT, it is possible to realize a high-flexible color adjustment without increasing the processing time.

Further, the color adjustment is carried out for color coordinate data corresponding to the addresses of the cross points of the color converting LUT, and for data of color converting original color space (scanner color space) having a relatively clear relation with respect to the measuring color space. Therefore, as compared with the known color adjustment for adjusting data in color material color space which is prone to be varied in relation with respect to the measuring color space, stable color adjustment which can obtain a desired result easily can be carried out.

Furthermore, in the second embodiment, the color conversion is carried out two independent stages, i.e., basic color conversion and differential color conversion. Only with the first basic color conversion, it is possible to convert the colors with high precision using high polynomial approximation, and by the differential color conversion which functions as fine adjustment, more precise color conversion can be achieved. This makes it possible to stably adjust colors for a long time because the color converting parameter can be set in accordance with operating state, for example, the differential converting parameters can be generated after operation for absorbing difference of apparatus and variation with time.

In addition, since the color composition of color patch image can be changed between the basic color conversion and the differential color conversion, it is possible to use different color composite. For example, it is possible to use a patch image having smaller number of colors which is easy to handle and suitable for operation in field.

Further, the basic color converting parameter and the differential color converting parameter are independently obtained and then, and characteristics which can be seen in both the color converting parameters are reflected on a single color converting LUT. Therefore, only one color conversion in LUT system suffices in the image processing and therefore, the processing time is reduced, and color conversion with high precision is achieved. This fact can also reduce a hardware scale into one time color conversion, and apparatus cost can be reduced also.

Since it is possible to defeat the differential color conversion by the initializing section, when the differential color converting parameter is not required particularly such as when just after the basic color converting parameter is set, it is possible to omit the setting operation of the differential color converting parameter.

As explained above, especially in the image processing apparatus of the first embodiment, colors of the color coordinate data corresponding to addresses of the cross points of the color converting LUT are adjusted, the color conversion (only the color conversion from RGB to CMY) is carried out using parameters which do not affect the color adjustment on the color adjustment result, the color converting LUT is written with this color conversion result, thereby adjusting the colors of the input image. Therefore, even when the colors are adjusted, the image can be processed by the same processing procedure as that of the case non-adjustment, and it is possible to prevent the processing time in the image processing from increasing.

Furthermore, in the second embodiment, the color conversion is carried out two independent stages, i.e., basic color conversion and differential color conversion. Only with the first basic color conversion, it is possible to convert the colors with high precision using high polynomial approximation, and by the differential color conversion which functions as fine adjustment, more precise color conversion can be achieved.

Further, the basic color converting parameter and the differential color converting parameter are independently obtained and then, and characteristics which can be seen in both the color converting parameters are reflected on a single color converting LUT. Therefore, only one color conversion in LUT system suffices in the image processing and therefore, the processing time is reduced, and color conversion with high precision is achieved. This fact can also reduce a hardware scale into one time color conversion, and apparatus cost can be reduced also.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image processing apparatus comprising:

storing means for storing first color coordinate data represented in first color space corresponding to a cross point address of a color converting look-up table;

color adjustment means for adjusting color in the first color coordinate data stored in the storing means to output second color coordinate data represented in the first color space so as to carry out a predetermined color adjustment in an input image;

first converting means for converting the second color coordinate data output from the color adjustment means to output third color coordinate data represented in a second color space;

renewal means for renewing the color converting look-up table based on the third color coordinate data output from the first converting means; and second converting means for converting first image data represented in a third color space which was input, based on the color converting look-up table which was renewed by the renewal means, and outputting a second image data represented in the second color space.

2. A color image processing apparatus according to claim 1, wherein the color adjustment means includes a nonvolatile rewritable memory for storing first color adjustment parameter;

composing means for composing an input second color adjustment parameter and first color adjustment parameter stored in the nonvolatile rewritable memory, thereby outputting a third color adjustment parameter; and color adjustment means for adjusting a color of the first color coordinate data stored in the storing means based on the third color adjustment parameter of the composing means to output the second color coordinate data represented in the first color space.

3. A color image processing apparatus according to claim 1, wherein the first converting means includes an LCH/RGB converting section for converting the second color coordinate data output from the color adjustment means to output RGB color coordinate data represented by RGB signal; and an LCH/RGB non-adjustment color converting section for outputting the third color coordinate data having the RGB color coordinate data represented in the second color space.

4. A color image processing apparatus comprising:

storing means for storing first LCH color coordinate data which are LCH color coordinate data corresponding to a cross point address of a color converting look-up table;

color adjustment means for adjusting the first LCH color coordinate data to output second LCH color coordinate data so as to carry out a predetermined color adjustment in an input image;

first converting means for converting the second LCH color coordinate data output from the color adjustment means into first CMY color coordinate data;

renewal means for renewing the color converting look-up table based on the first CMY color coordinate data from the first color converting means; and second converting means for converting input RGB image data into second CMY image data based on the color converting look-up table which was renewed by the renewal means.

5. A color image processing method comprising:

storing step for storing first color coordinate data represented in first color space corresponding to a cross point address of a color converting look-up table;

color adjustment step for adjusting color in the first color coordinate data stored in the storing step to output second color coordinate data represented in the first color space so as to carry out a predetermined color adjustment in an input image;

first converting step for converting the second color coordinate data output from the color adjustment step to output third color coordinate data represented in a second color space;

renewal step for renewing the color converting look-up table based on the third color coordinate data output from the first converting step; and second converting step for converting first image data represented in a third color space which was input, based on the color converting look-up table which was renewed by the renewal step, and outputting a second image data represented in the second color space.

6. A color image processing method according to claim 5, wherein the color adjustment step includes a nonvolatile rewritable memory for storing first color adjustment parameter;

composing step for composing an input second color adjustment parameter and first color adjustment parameter stored in the nonvolatile rewritable memory, thereby outputting a third color adjustment parameter; and color adjustment step for adjusting a color of the first color coordinate data stored in the storing step based on the third color adjustment parameter of the composing step to output the second color coordinate data represented in the first color space.

7. A color image processing method according to claim 5, wherein the first converting step includes an LCH/RGB converting section for converting the second color coordinate data output from the color adjustment step to output RGB color coordinate data represented by RGB signal; and an LCH/RGB non-adjustment color converting section for outputting the third color coordinate data having the RGB color coordinate data represented in the second color space.

8. A color image processing method comprising:

storing step for storing first LCH color coordinate data which are LCH color coordinate data corresponding to a cross point address of a color converting look-up table;

color adjustment step for adjusting the first LCH color coordinate data to output second LCH color coordinate data so as to carry out a predetermined color adjustment in an input image;

first converting step for converting the second LCH color coordinate data output from the color adjustment step into first CMY color coordinate data;

renewal step for renewing the color converting look-up table based on the first CMY color coordinate data from the first color converting step; and second converting step for converting input RGB image data into second CMY image data based on the color converting look-up table which was renewed by the renewal step.

* * * * *